July 22, 1930.   T. BOVEY   1,771,371
HEAT TRANSFERRING SYSTEM
Filed April 4, 1928
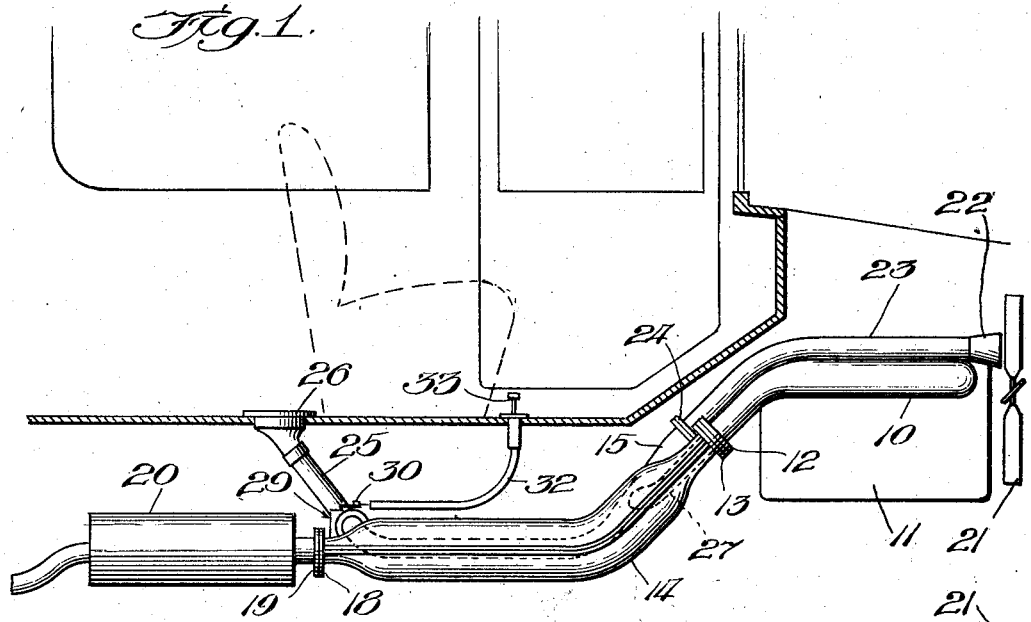
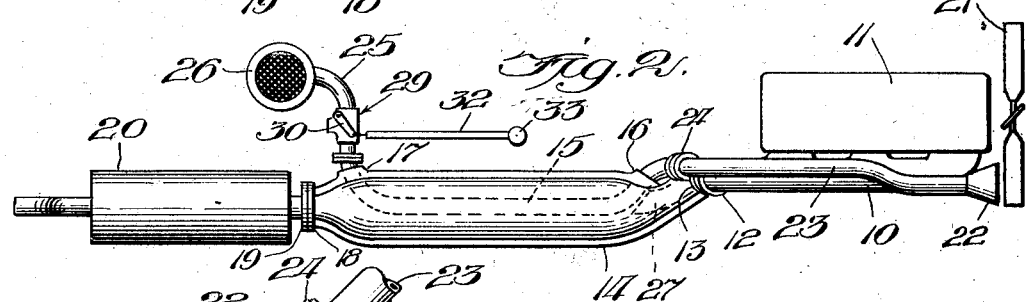
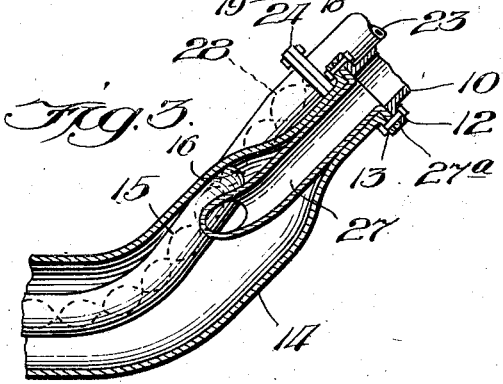
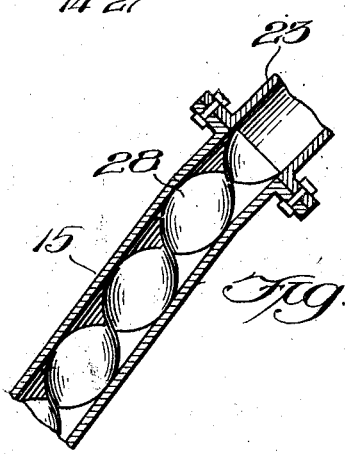
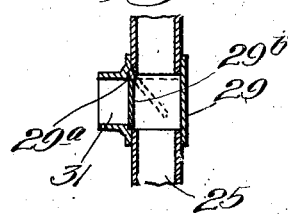
Inventor
Thomas Bovey Patented July 22, 1930

1,771,371

UNITED STATES PATENT OFFICE

THOMAS BOVEY, OF CHICAGO, ILLINOIS, ASSIGNOR, BY MESNE ASSIGNMENTS, TO METALCRAFT HEATER CORPORATION, OF GRAND RAPIDS, MICHIGAN, A CORPORATION OF MICHIGAN

HEAT-TRANSFERRING SYSTEM

Application filed April 4, 1928. Serial No. 267,345.

My invention relates generally to a heat transferring system for use with internal combustion engines, and it is particularly adapted for utilization of a portion of the surplus heat incident to the operation of the engine for heating the interior of the bodies of engine-propelled vehicles, such as automobiles, motor boats, airplanes, etc.; and it has further utility in controlling the temperature of the engine exhaust gases to vary the pressure and rate of discharge of the same whereby engine efficiency is greatly increased.

This invention is well adapted to a heating system of the so-called "hot-core" type for heating the interior of an automobile body wherein the exhaust gases are transmitted to and through a casing or heating chamber through which a conduit for transmitting air or other heat-absorbing medium passes. One example of such a system is disclosed in an application filed by me on January 13, 1928, Serial No. 246,435, for automobile heaters. It is to be understood, however, that my invention is not necessarily limited to a system of the character disclosed by my said application, but it may be used in any instance where similiar problems and conditions are to be met, and regardless whether the interior of an automobile body, or a motor boat or airplane, etc., interior is to be heated.

From the standpoint of utility in controlling the temperature of the exhaust gases, it is a well recognized fact that highest engine efficiency with maximum engine torque and brake horse power demands that the exhaust gases to be discharged from the cylinders and to atmosphere quickly without back pressure immediately upon having performed their work,—otherwise engine efficiency is lowered and power is lost. Taking automobile construction as an example, efforts have been made from time to time to effect a sufficiently rapid and unrestricted discharge of the exhaust gases to eliminate or reduce to a minimum the objectionable back pressure condition, but all such attempts have completely failed in so far as the ideal and maximum efficiency condition is concerned. Conditions in this respect have become aggravated with the advance and use of the present type high-speed high-compression engines. Ordinary mufflers with their comparatively large exhaust gas-expansion chambers reduce this back pressure condition to a certain extent but, regardless of the various forms resorted to, they do not function to wholly overcome it and engine efficiency and power continues to be lower than would be the case if the ideal or near-ideal exhaust conditions existed. This pressure condition may be relieved somewhat (but not to the desired extent) by discharging the exhaust gases directly to atmosphere near the cylinders but, as is well known, present conditions do not permit of this due to the excessive noise and other objectionable conditions with the result that an exhaust pipe of considerable length is usually employed and it discharges at a point near the rear of the vehicle.

Repeated demonstrations under the most critical and exacting conditions have shown that, with the use of my invention, back pressure of the exhaust gases is practically eliminated, or at least reduced to such a point that any objectionable effect of the same is not noticeable; and one of the main objects of my invention is to increase engine efficiency by eliminating exhaust gas back pressure and providing greater brake horse power and greater engine torque. This object of my invention is accomplished by the provision of means adapted to increase the rate of flow of the exhaust gases through the exhaust pipe to atmosphere to such an extent that such gases, during each engine cycle, are discharged from the engine cylinders immediately upon having performed their work.

Another important object of my invention is to provide a simple and cheap heat transferring system which is readily adaptable for the heating of the interior of the body of an engine-propelled vehicle, and which is capable of a maximum of transfer of heat from the exhaust gases to a heat-absorbing medium which may be passed to the interior of the vehicle body to heat and ventilate the same. In other words, the heat given up by the exhaust gases in the heat transferring or condensing and expansion action which I employ may be utilized for the heating of the vehicle body. In the use of my invention, say with an automobile, the arrangement is such that all of the discharging heat-absorbing medium may be passed directly to atmosphere or it may all be discharged directly to the interior of the vehicle body or in part to the vehicle body and in part to atmosphere, and, in all the foregoing instances, the foregoing advantages contributing to greater engine efficiency, are obtained.

Another object is to provide a heating chamber with a conduit passing therethrough for transferring a heat-absorbing medium, the heating chamber being associated with means for causing the exhaust gases to impinge directly upon the heat absorbing medium conduit in a concentrated stream at or about the point where such conduit enters the heating chamber to cause such conduit to become quickly and highly heated at that point. In this manner a great amount of heat is immediately absorbed by the heat-absorbing medium as it enters the heating chamber. This means, which may take the form of a nozzle or deflecting surface, or the like, is so shaped and located relative to the above conduit that the exhaust gases are caused to take a more or less swirling action through the heating chamber whereby the entire conduit is quickly brought to and maintained in a highly heated condition, and a more uniform and effective heat transfer takes place throughout such heating chamber.

A further object is to provide means for rendering the heat-absorbing medium conduit more efficient as a heat-collecting and heat-transferring agent, so that a greater amount of the heat of the exhaust gases is utilized and the exhaust gases are cooled more quickly and to a greater extent. To this end, I employ a spiral blade or plate within and extending substantially throughout that part of the conduit disposed within the heating chamber, such blade not only defining an irregular-shaped passage, but also providing a greater heat-collecting surface which increases, by the utilization of the principle of convection, the heat transfer to the heat-absorbing medium. The constant and rapid swirling and mixing action of the heat-absorbing medium, due to the spiral conduit passage, prevents the formation of cool or cold strata or films of the absorbing medium therein as it passes through the conduit which, together with the longer path which the absorbing medium must traverse, results in more uniform heat-absorption and a greater amount of heat is transferred to the absorbing medium in its traverse through the heating chamber.

An additional object is to provide for greater quietness in operation. The arrangement of my heating chamber, which may also be termed the expansion chamber, is such that it of itself provides the desirable quietness in operation and, in some instances, the usual muffler may be dispensed with. In any event, the muffler need be only of simple inexpensive construction when my invention is used thereby eliminating the use of most of the previously employed forms of muffler.

Other objects and advantages will become apparent as this description progresses and by reference to the drawing wherein,—

Figure 1 is a vertical sectional view through a portion of an automobile having a heat transferring system embodying my invention applied thereto and wherein the force for driving the air, or other heat-absorbing medium, from an outside source through the heating chamber is derived from the cooling fan of the automobile;

Fig. 2 is a plan view of the system of Fig. 1 shown in relation to the engine, fan and muffler of the automobile;

Fig. 3 is an enlarged sectional view of the end of one half of the heating casing or chamber which receives the exhaust gases, and showing the directing means for causing the exhaust gases, as they are admitted to said chamber, to impinge directly upon the air conduit therein;

Fig. 4 is an enlarged and separated sectional view of a portion of the air, or heat-absorbing medium, conduit which passes through the heating chamber; and Fig. 5 is an enlarged sectional view through the control valve for the heat control system.

With particular reference to the drawing, my invention is shown as applied to a form of so-called "hot core" type of heater which is associated with the manifold 10 of the engine 11 in close proximity thereto. The rear part of the manifold is provided with a flanged joint member 12 to which is connected a similar joint member 13 of a detachable shell or casing 14. This shell or casing 14 is enlarged throughout the greater part of its length and constitutes what I may term the heating chamber or expansion chamber which receives the hot exhaust gases directly from the manifold. This chamber is of such size as to readily receive and freely permit of rapid expansion of the exhaust gases as will be explained further hereinafter.

The casing or heating chamber 14 is, preferably, formed of two detachable sections (a portion of one section being shown in Fig. 3) which permits of the installation of a jointless pipe 15 therein. This pipe 15 passes into and out of the casing through openings 16 and 17, and the joint between the pipe and casing at such point may be made air-tight in any desired manner to prevent escape of the exhaust gases. The pipe 15 is of such size, and the portion thereof which passes through the heating chamber is of such length, that large quantities of heat may be quickly drawn thereby from the exhaust gases which pass through the heating chamber; and this heat is absorbed by or transferred to the air which passes through the pipe 15 as will become obvious hereinafter.

The rear of the heating chamber casing may be formed somewhat similarly to the forward end thereof and is provided with a flange member 18 adapted to be secured to the flange member 19 of a muffler 20 which may be of an ordinary shell formation. The cooling fan 21 of the automobile is located at the usual position and is adapted to force cold air through the flared receiving mouth 22 of the cold air pipe 23. It will be understood that any other desired form of means for providing and receiving air currents may be used instead of the fan 21 and the receiving mouth 22. For example, the air delivered to the pipe 15 may come from the interior of the automobile body and may be delivered therefrom by an electric fan which directs its air currents into an adjacently located receiving mouth, the construction being similar to that shown in the drawing except as to the location of the respective parts. In some instances the air might be forced into the pipe 23 by the action set up by the forward movement of the vehicle.

Both the jointless pipe 15 and the cold air pipe 23 are provided with joint members which are secured together to provide a fluid-tight joint 24. The opposite end of the jointless pipe 15 which projects through the casing as at 17, is also provided with a joint member which is secured to a mating joint member of a pipe 25 which, in the form shown in the drawings, extends to the floor register 26 located on the interior of the automobile body. Thus, it will be seen that the fan 21 forces air through the pipe 23 into the jointless pipe 15 and as the air passes through the pipe 15, it absorbs heat from such pipe, and consequently from the exhaust gases passing through the chamber 14.

I have found by practical demonstration that the collection of the heat by the pipe 15 from the exhaust gases is aided and the efficiency of the heat is greatly increased by directing such gases in a more or less concentrated stream directly against such pipe at or about the point where it enters the heating chamber. I accomplish this by mounting an unrestricted nozzle or deflector 27 in the inlet end of the casing 14, such nozzle being curved toward the pipe 15 and having its outlet end so shaped that exhaust gases in passing therethrough from the manifold impinge directly upon the pipe. This nozzle is provided at its rear end with a flange 27$^a$ which is adapted to be secured between the flange members 12 and 13 of the manifold and casing in such a way that all of the exhaust gases discharged from the manifold must pass through the nozzle in entering the heating chamber. Instead of the nozzle, I may employ a deflector plate (not shown) of suitable size and shape which will direct the hot gases against the pipe 15. By locating the casing 14 in close proximity to the manifold, the gases almost immediately enter the casing 14. These gases are very hot and, by directing them as above stated, a so-called hot spot is created in the pipe 15 near the place where it enters the casing. It will be noted from Fig. 2 that the nozzle 27 not only serves to direct these hot gases against the incoming part of the pipe 15, but it is also so shaped and positioned that it directs the gases in such a way as to cause them to take a more or less swirling action in passing through the casing. In this manner the gases are kept in motion and admixed and directed in intimate contact with the pipe 15 with the result that a greater amount of heat is very quickly drawn from the exhaust gases.

More specifically, in operation, with air serving as the heat-absorbing medium, it immediately strikes a very hot spot upon entering that part of pipe 15 within the chamber 14 with a consequent rapid transfer of heat from the pipe thereto, and this transferring or absorbing action continues to take place as this air passes on through the pipe 15. In case this air or heating medium is directed to the interior of the car body, its highly heated condition causes the interior of the car body to be very quickly heated and the interior will be maintained in that condition. Along with the foregoing, the hot exhaust gases in passing through the nozzle 27 and striking the cooler surface of the pipe 15, give up heat very rapidly and become cooled. This cooling action continues to take place as the gases continue to pass through the chamber. The enlarged chamber 14 of itself normally provides for expansion of the gases as they enter the same with a resultant cooling effect which produces a differential temperature and differential pressure condition as between the engine manifold and its connections and the chamber 14 with a resultant increased flow of the exhaust gases from the manifold toward the expansion chamber. The increased cooling of the exhaust gases by virtue of their striking the cooler pipe 15, which constantly tends to be cooler because of the cool air continuously passing thereinto, sets up an additional condensing or cooling action and increases the above differential condition between the gases in the chamber 14 and the manifold whereby there is a further increased induced flow of the gases from the manifold into the chamber and thence to atmosphere. The continued cooling action of the exhaust gases due to their passage on through the large chamber 14, of course, still further increases this differential temperature and differential pressure condition. The result of all the foregoing is that the exhaust gases are so rapidly withdrawn from the engine cylinders and discharged that back pressure is practically eliminated and the efficiency of the engine, engine torque and brake horse power are increased to a maximum point.

Since the pipe 15 serves as a heat-collecting medium, obviously more heat will be collected thereby and transferred therefrom to the medium passing therethrough by increasing the area of the heat-collecting surface and the surface with which the air contacts. In this instance, I increase the efficiency of the heat-collecting agent by disposing a spiral or twisted blade 28 within the pipe 15 which provides a spiral passage therethrough. This metal blade, as well as the pipe 15, collects heat from the exhaust gases within the heating chamber, so that the air passing through the pipe 15 passes over a greater heated surface which fact, in addition to the obvious convection action, causes a greater amount of heat to be absorbed by the air. This greater heat-transferring effect is greatly aided by the fact that the air in passing through the spiral passage takes a swirling motion and is stirred-up and mixed so that no cool or cold insulating layers or films exist therein. Furthermore, the air is caused to traverse a longer path in more intimate contact with the interior of the pipe 15. In accomplishing the foregoing, a greater and more rapid cooling of the exhaust gases takes place.

In view of the great utility of my invention, it is desirable to gain the benefits of the same under all kinds of operating conditions. For example, in the case of its use with an automobile, the heat of the exhaust gases may be utilized for the heating of the interior of the car body, at the same time gaining the advantage of increased engine efficiency as above explained; and, during hot weather when heating of the interior of the car body is not required, I can dispense with the body heating feature while still utilizing the condensing feature to increase engine efficiency. To this end, I may employ a valve 20 which is located in the pipe 25 (Figs. 2 and 5) for controlling the flow of the air from the jointless pipe 15 to the air register 26 in the car body. This valve is, preferably, of a three-way type having a pivot shaft 29$^a$ carrying a valve disk 22$^a$. The pivot shaft is mounted in bearings in the valve casing in such a manner that in one position (shown in full lines in Fig. 5) the atmospheric outlet opening 31 is closed and the heated air is caused to pass directly through the pipe 25 to the air register 26. The valve disk 29$^b$ may also be moved so as to entirely cut off the portion of the pipe 25 leading to the air register 26 and the heated air from pipe 15 caused to pass to atmosphere through the outlet opening 31 (see dotted line position of valve disk in Fig. 5); or if desired, this valve disk may be moved to an intermediate position in which the heated air from the pipe 15 may be caused to pass in part to the register 26 and in part to the atmosphere through the opening 31 (see neutral position of valve disk indicated by dotted lines in Fig. 5). The latter position of the valve may be varied to vary the amounts of air admitted to the register 26 and to atmosphere to variably control the temperature of the air within the car body.

It is believed that the operation of my invention is clear from the foregoing and needs no further discussion.

It will be readily appreciated that, while my invention is illustrated and described as applied to the heating of an automobile, involving the use of an air register, yet it may be employed solely for the purpose of reducing the temperature of the exhaust gases without utilization of the enclosure-heating advantages.

It will be understood that while in my illustrated embodiment I have described air as the heat-absorbing medium, by the use of the term "heat-absorbing medium" I intend to include any medium, gaseous, fluid or otherwise, which may be passed through the heating chamber and to which the heat of the exhaust gases may be transferred for cooling of the latter. It is to be further understood that while my invention is particularly adaptable to a heating medium in the form of the exhaust gases of an internal combustion engine, however, it may have utility in other instances where other heating mediums are employed and where similar conditions as to the heating of enclosures or heating transfer effects are to be accomplished. Furthermore, while I have shown one embodiment of my invention, it will be appreciated that various changes in details and arrangement of parts may be made without departing from the spirit and scope of my invention as defined by the claims which follow.

I claim:

1. In a system of the character described, the combination of a casing having an inlet and outlet and forming a chamber through which a fluid circulates, a conduit which passes in part through said chamber and through which fluid from a different source circulates, one of said fluids constituting a heating medium and the other a heat-absorbing medium, and fluid-carrying means associated with said casing adjacent the inlet thereto for causing the in-flowing fluid to impinge directly upon said conduit therewithin in a stream formation.

2. In a system of the character described, the combination of a casing having an inlet and outlet and forming a chamber through which a fluid circulates, a conduit which passes in part through said chamber and through which fluid from a different source circulates, and fluid-confining means associated with said casing adjacent the inlet thereto for causing the inflowing fluid to impinge directly upon said conduit therewithin in a concentrated stream, said means being so shaped and located relative to the enclosed part of said conduit that said impinging fluid stream is caused to move therealong and in intimate contact therewith within said chamber.

3. In a system of the character described, the combination of a casing having an inlet and outlet forming a chamber through which a fluid circulates, a conduit which passes in part through said chamber and through which a fluid flows from a different source, one said fluid pressure constituting a heating medium and the other a heat-absorbing medium, a deflecting member carried by the inlet end of said casing and through which the fluid entering said chamber passes, said member being of such size and so shaped that the fluid passing therethrough is caused to impinge directly upon said conduit in a stream formation without added flow-restriction.

4. In a system of the character described, the combination of a casing having an inlet and outlet forming a chamber through which a heating medium circulates, a conduit which passes in part through said chamber and through which a heat-absorbing medium circulates, a cylindrical deflector carried by the inlet end of said casing and through which the heating medium entering said chamber passes, said deflector being of such size and so shaped that the heating medium passing therethrough is caused to impinge directly upon said conduit in a stream, said member being also so positioned relative to said conduit that said impinging stream is caused to swirl along and in intimate contact with that part of said conduit which is within said chamber.

5. In a heat transferring system for engine-propelled vehicles, the combination with a propelling means, of an outer conduit for transmitting a heating medium, an inner conduit, a portion of which passes through said outer conduit, for transmitting a heat-absorbing medium, means for forcing a heat-absorbing medium through said inner conduit and toward the interior of the vehicle, and conduit means for causing said heating medium as it enters said outer conduit to impinge directly upon said inner conduit adjacent the point where said inner conduit enters said outer conduit.

6. In a heat transferring system for engine-propelled vehicles, the combination with a propelling means, of an outer conduit for transmitting a heated fluid, an inner conduit, a portion of which passes through said outer conduit, for transmitting a heat-absorbing fluid, means for forcing a heat-absorbing fluid through said inner conduit and toward the interior of the vehicle, and fluid-carrying means for causing said heating fluid as it enters said outer conduit to impinge directly upon said inner conduit in a stream adjacent the point where said inner conduit enters said outer conduit, said means bearing such position relation to that part of said inner conduit within said outer conduit that said impinging stream is caused to move therealong in intimate contact therewith.

7. In a heat transferring system for engine-propelled vehicles, the combination with a propelling means, of an outer conduit having an inlet and outlet for transmitting a heating medium, an inner conduit, a portion of which passes through said outer conduit, for transmitting a heat-absorbing medium, means for forcing a heat-absorbing medium through said inner conduit and toward the interior of the vehicle, and a deflecting conduit member carried by the inlet end of said outer conduit for positively directing said heating medium against and along said inner conduit.

8. In a heat transferring system for engine-propelled vehicles, a heat transfer unit comprising an outer cylindrical casing adapted to be connected at one end to the engine exhaust manifold and at the other end to the exhaust conduit, an inner conduit which passes in part through said outer casing in spaced relation thereto and with which the hot exhaust gases contact, means for forcing a cool heat-absorbing medium through said inner conduit, and a deflector extending within said casing, said deflector having said discharge end extended inwardly toward said inner conduit and having its discharge end in such a plane relative to the adjacent surface of said inner conduit that the exhaust gases are caused to impinge directly on said inner conduit and to swirl thereabout in passing through said outer casing to said exhaust conduit.

9. In a heat transferring system for engine-propelled vehicles, a heat transfer unit comprising an outer cylindrical casing having a curved end part and a straight body part and having its curved end adapted to be connected to the engine manifold and its other end adapted to be connected to said exhaust conduit, a U-shaped conduit having a straight base part within and extending along the straight part of said outer casing and having its U-arms passing through the wall of said casing at one side, means for forcing a heat-absorbing medium through said U-conduit, and a directing member carried at the curved end of said casing through which all exhaust gases from said manifold enter said casing, said member extending downwardly and having its discharge end directed at an angle toward the adjacent surface of said inner conduit, the discharge end of said member being so shaped as to cause the exhaust gases to impinge directly upon said inner conduit in a concentrated stream at a point near where it enters said casing.

10. In a heater of the class described, a tubular shell having a restricted inlet at one end adapted to receive a heating medium from a suitable source, means for conducting a fluid through the shell so that said fluid will be heated while in the shell, including a tube having a portion adjacent the inlet aforesaid extending longitudinally of the shell, and means for directing the heating medium against one side of the tube to maintain a hot spot, including a tube having a portion fitting within the inlet aforesaid and having another portion curving toward and terminating at the side aforesaid of said tube.

11. In a heater of the class described, a tubular shell having an inlet at one end adapted to receive a heating medium from a suitable source, means for conducting a fluid through the shell so that said fluid will be heated while in the shell, including a tube having a portion adjacent the inlet aforesaid extending longitudinally of the shell, and means for directing the heating medium against one side of the tube to maintain a hot spot, including a short tube having a portion associated with the inlet in such a way that the heating medium received by the inlet will be received in the short tube, and having another portion curving toward and terminating at the side aforesaid of said tube whereby the heating medium discharged from the short tube will impinge against the said side of the first mentioned tube.

In testimony whereof, I have subscribed my name.

THOMAS BOVEY.